M. S. WALKER.
LOCATING RULE FOR TYPE WRITERS.
APPLICATION FILED DEC. 26, 1913.
1,215,441.
Patented Feb. 13, 1917.
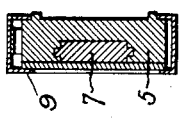
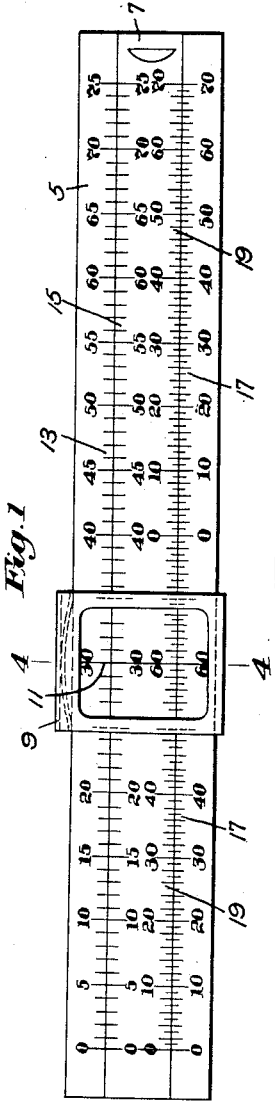
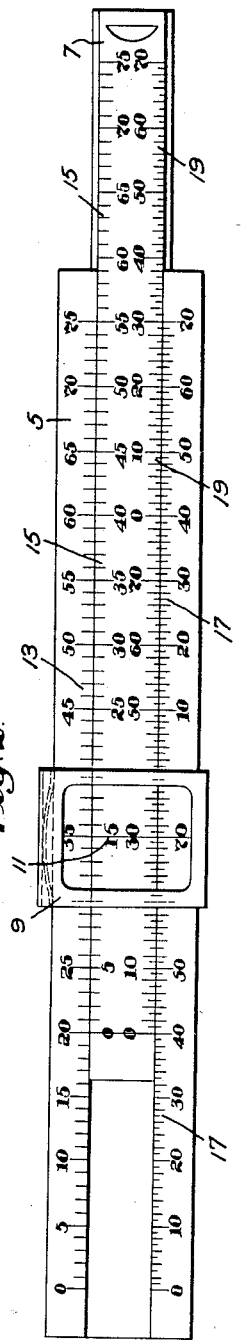
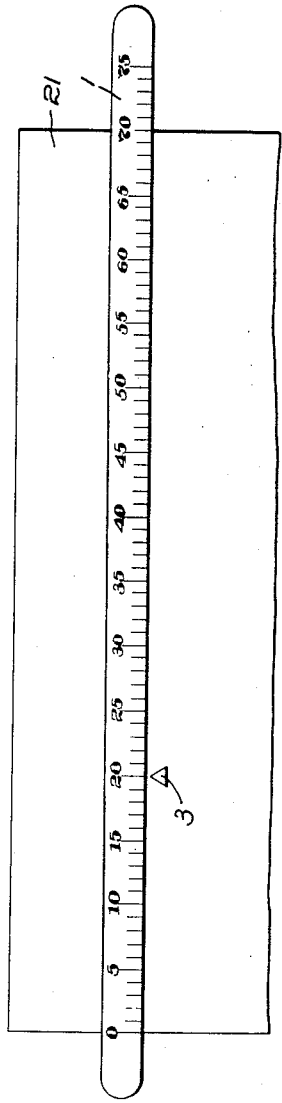
Witnesses:
Horace A. Crossman
Carl L. Choate
Inventor:
Martha S. Walker
by Emery Booth, Janney & Varney
Attys

UNITED STATES PATENT OFFICE.

MARTHA S. WALKER, OF WESTWOOD, MASSACHUSETTS.

LOCATING-RULE FOR TYPE-WRITERS.

1,215,441.   Specification of Letters Patent.   Patented Feb. 13, 1917.

Application filed December 26, 1913. Serial No. 808,774.

*To all whom it may concern:*

Be it known that I, MARTHA S. WALKER, a citizen of the United States, and resident of Westwood, Massachusetts, have invented an Improvement in Locating-Rules for Type-Writers, of which the following description, in connection with the accompanying drawings, is a specification, like characters on the drawings representing like parts.

This invention is a rule for use primarily in connection with typewriters to accurately locate on a page headings, items to be tabulated and other matters, although it may be used for other purposes if desired.

The character of the invention may be best understood by reference to the following description of an illustrative embodiment thereof shown in the accompanying drawing, wherein:

Figure 1 is a plan of an illustrative rule embodying the invention;

Fig. 2 is a similar view of the rule showing parts thereof in a different position;

Fig. 3 is a diagrammatical representation of the printing point scale and printing point of a typewriter with a portion of a page associated therewith; and Fig. 4 is a section taken on line 4—4 of Fig. 1.

Referring to the drawing, it is customary to provide a typewriter with a printing point scale shown diagrammatically herein at 1 (Fig. 3) fixed on the carriage of the machine to extend across the page to be typed. Coöperating with this scale is a stationary printing point or index 3 fixed to the frame of the machine to indicate where the imprint will occur on the page.

Heretofore the locating of the carriage in readiness to print the heading at the desired point on the page has been done either by guess work, or if accuracy is desired by performing a mental problem which involves a considerable waste of time. For example, it may be supposed that it is desired to locate a heading in the center of a line of a page having a length equal to 70 graduations of the printing point scale. First it is necessary to count accurately and carefully the total number of letters, word spaces and punctuation marks in the heading. It may be supposed that this number is 30. Then 30 is subtracted from 70, leaving 40 graduations on the line of the page which will not be occupied by the heading. This leaves 20 graduations on each side of the heading and the typist therefore adjusts the carriage scale 1 to a position in which the graduation thereon marked "20" is opposite the printing point 3. The heading is then typed, commencing at this point and is thus located in the center of the line. If it is desired to locate the heading at a point other than in the center of the line a more difficult problem is involved.

A device will now be described for greatly simplifying the process of accurately locating headings, items, etc., at any desired point on a line of a page. An illustrative device embodying the invention shown in Figs. 1, 2 and 4 comprises a scale member 5 in the form of a strip of wood with a longitudinal groove milled out of the center thereof to receive a slide member 7 conveniently held therein by tongue and groove connections. Embracing the side edges of the member 5 is a U-shaped plate 9 having a central aperture across which is stretched a hair line index 11.

The member 5 is provided with a scale 13 comprising graduations equal to those of the typewriter printing point scale, or other appropriate scale, and the slide member 7 is provided with a similar scale 15.

The member 5 also may be provided with two scales 17 each equal to one-half of the scale 13, but having twice as many graduations. The slide member also is provided with a scale 19 similar to a scale 17.

In use it may be supposed that it is desired to locate a heading centrally on a page 21 in the typewriter. To accomplish this the slide member 7 is pulled out to the left of Fig. 1 and the length of the heading is measured by its scale 15. It may be supposed that the length of this heading measures 30 graduations. A glance at the printing point scale shows that the width of the page equals 70 graduations. The hair line index 11 is adjusted along the member 5 into registration with the graduation marked 35, (Fig. 2) this being the center of the page. Then the slide member 7 is adjusted to the right until the graduation thereon marked 15 (one-half of the length of the heading) is in registration with the index. Then the graduation of the slide member 7 marked zero is in registration with the graduation on the member 5 marked 20, indicating that the carriage scale graduation 20 should be placed at the printing point 3 (Fig. 3) in readiness to print the heading.

It will be understood that it is not necessary to count the number of letters, word spaces and punctuation marks in the heading, but this number can be instantly ascertained and the heading quickly and accurately located.

The device may be used for locating headings, items, etc., in any other positions than in the center of the page. If, for example, it is desired to locate a heading centrally on the left hand half of the page a procedure such as described above may be followed, with the exception that the hair line index 11 would be adjusted to a point accurately at one-quarter of the distance across the page. This may be accomplished readily by adjusting the index to the 35th graduation on the lower scale 17 containing the finer graduations, measuring one-half of the page.

For purposes of illustration the rule described herein is shown as having a scale of a length equal to a 75 graduation scale of a typewriter. The typewriter scales vary in length according to the use thereof. In some cases a printing point scale 115 graduations in length is employed. Where such long scales are used it is practically impossible to guess with any accuracy the proper location of a heading, item or other matter across the page. The device described is, therefore, very useful in connection with long scale typewriters.

The rule described may be used separate from the typewriter or if desired it may be attached to the typewriter, work holder or other device as desired.

By my invention is provided a simple device by which matters may be located quickly and accurately wherever desired across the page.

Having described one illustrative embodiment of the invention without limiting the same thereto, what I claim as new and desire to secure by Letters Patent is:

In apparatus for locating a typewritten heading or item of predetermined length in predetermined relation to the sheet without measurement from the margin of the sheet, the combination of a scale member having graduations and numbers thereon corresponding and equal to those of a typewriter printing point scale, a co-acting scale element having similar graduations for measuring the length of said heading or item and slidably mounted relative to said scale member, and a coöperating sliding index element for indicating the relative position of the center of the typewritten heading or item and the predetermined relation to the sheet of said center, while the starting point of said heading or item is indicated by the graduation on said scale member corresponding to the zero of said co-acting element.

In testimony whereof, I have signed my name to this specification, in the presence of two subscribing witnesses.

MARTHA S. WALKER.

Witnesses:
   HENRY T. WILLIAMS,
   JOHN R. MOULTON.